Feb. 24, 1970 R. FUELSTER ET AL 3,497,787
MINE HOIST CONTROL SYSTEM
Filed Feb. 3, 1967 9 Sheets-Sheet 3 fig.4.

INVENTORS.
RALPH C. FUELSTER
JAMES R. GRONSETH
ROBERT C. HARDIE
CLIFFORD G. PELKOLA
BY Parker & Carter
Attorneys.

Fig.12.

United States Patent Office 3,497,787
Patented Feb. 24, 1970

3,497,787
MINE HOIST CONTROL SYSTEM
Ralph C. Fuelster, Milwaukee, James R. Gronseth and Robert C. Hardie, Hales Corners, and Clifford G. Pelkola, Pewaukee, Wis., assignors to Nordberg Manufacturing Company, Milwaukee, Wis., a corporation of Wisconsin
Filed Feb. 3, 1967, Ser. No. 613,788
Int. Cl. H02p 1/00
U.S. Cl. 318—269                      4 Claims

ABSTRACT OF THE DISCLOSURE

An automatic control for a mine hoist having an electric motor and a weight biased, hydraulically releasable brake. The automatic control includes an electric hydraulic actuator to operate the brake hydraulic system and a programming device to sequentially start, accelerate, decelerate and stop the movement of the mine hoist by controlling the operation of the electric motor and the electric hydraulic actuator in accordance with the position of a mine car in the mine shaft.

Summary of the invention

This invention is concerned with an automatic control for a mine hoist and more particularly with such a control that may be connected to a manually operated hoist.

An object of this invention is an automatic control system which may be used with an electric motor and particularly an alternating current wound rotor hoist motor.

Another object is an automatic control system for a mine hoist which utilizes many of the components of an existing manual control system.

Another object is an automatic control system which may be used alternately with manual operation of the mine hoist.

Another object is an automatic control system which may be directly connected to the manually controlled brake levers.

Another object is an automatic control system which utilizes the hoist drum brake to regulate the speed and stopping of the hoist.

Another object is an automatic control system in which the hoist brake operation is coordinated with the operation of the hoist motor.

Another object is an autometaic control system in which complete manual control of the hoist may be maintained while the operation of the automatic control system is tested.

Other objects may be found in the following specification, claims and drawings.

The invention is illustrated more or less diagrammatically in the following drawings wherein.

Figure 1:
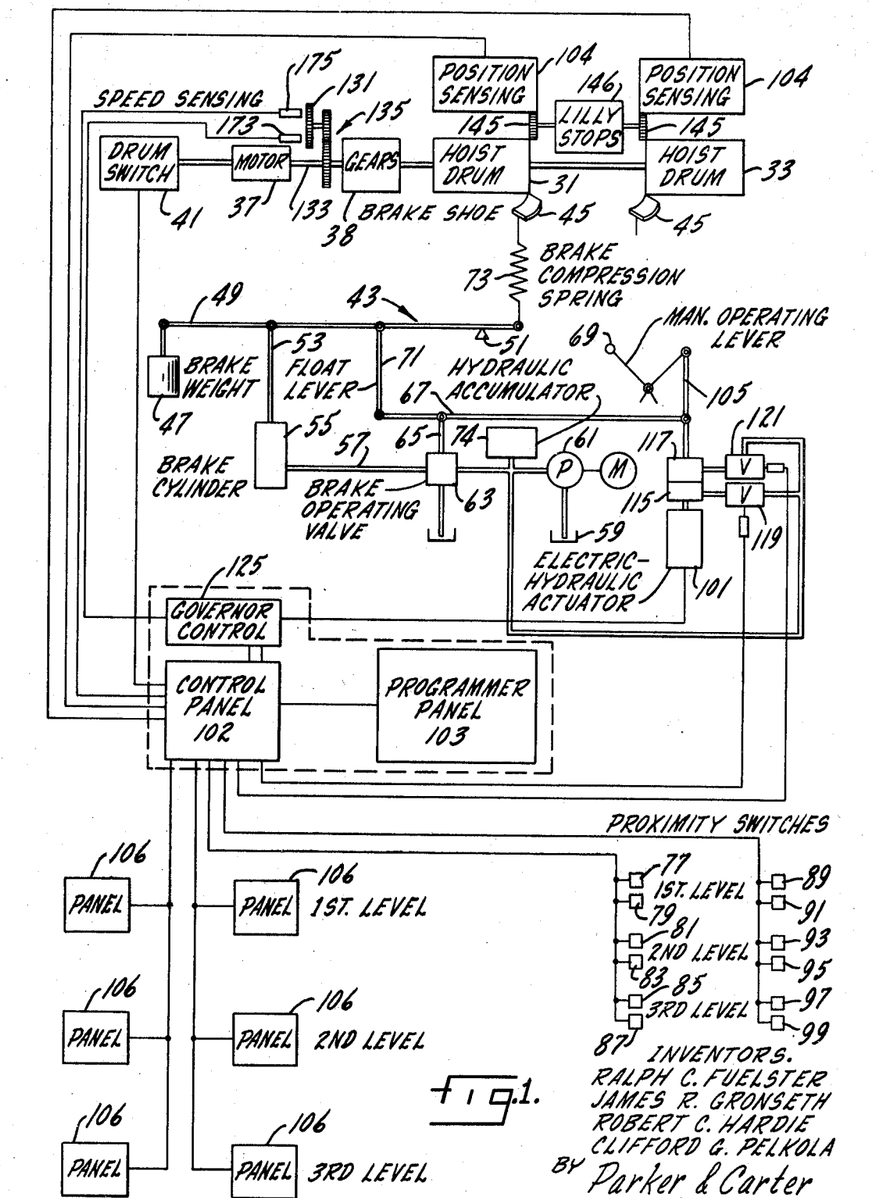
FIGURE 1 is a schematic drawing showing the components of the mine hoist automatic control.
Figures 1A, 2, 3, 7A, 7B:
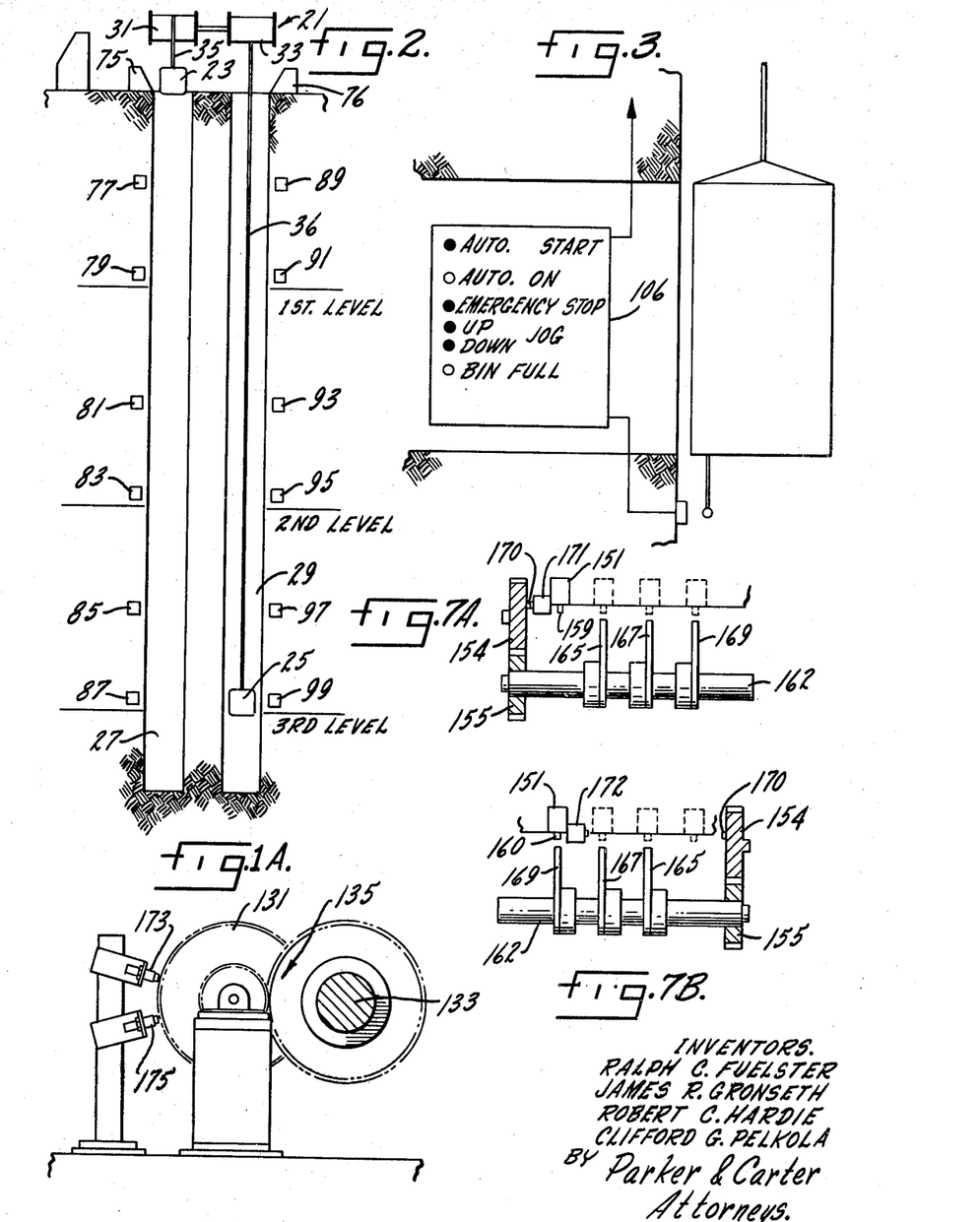
FIGURE 1A is an elevational view of the motor pinion shaft and speed sensing pickups.
FIGURE 2 is a schematic drawing showing a pair of parallel mine shafts and a mine hoist of the double drum balanced type.
FIGURE 3 is a schematic view showing a control panel and skip at one of the lower loading levels.
FIGURE 7A is a schematic view of one of the position sensing indicators showing its skip at the top of its shaft.
FIGURE 7B is a schematic view of the other position sensing indicator showing its skip at the lowest level of its shaft.

A mine hoist of the type with which an automatic control system of this invention may be utilized is shown diagrammatically in FIGURE 2. The mine hoist 21 includes skips or cars 23 and 25 positioned respectively in shafts 27 and 29. Hoist drums 31 and 33 are provided respectively for the shafts 27 and 29. Cables 35 and 36 respectively connect the skips 23 and 25 and the hoist drums 31 and 33. The hoist drums in this example are driven by an electric motor 37 of the alternating current wound rotor type through reduction gearing 38 as shown in FIGURE 1. The electric current to the electric motor 27 is controlled by a drum switch 41.

A brake actuating system 43 (FIGURE 1) is provided for the hoist drums 31 and 33 with each drum having two brake shoes 45 biased into engagement therewith by a weight 47 mounted at one end of a lever 49 pivoted about a fulcrum 51. For clarity, the lever 49 is shown as connected to only one of the brake shoes 45, but it should be understood that it is connected to both brake shoes. Operatively connected to the weight side of the lever 49 is a brake piston rod 53 connected to a piston mounted in a brake cylinder 55. Hydraulic fluid for moving the piston is supplied to the cylinder through a tube 57 from a reservoir 59 by means of a pump 61. The flow of fluid to the cylinder 55 is controlled by a brake operating valve 63. The quantity of hydraulic fluid allowed to pass through this valve is regulated by a plunger 65 which is connected by means of a linkage 67 to a manual operated brake lever 69. The plunger 65 is also connected to the brake shoe lever 49 by means of a float lever and linkage 71. Each brake shoe 45 is provided with a brake compression spring 73 to give a graduated response to braking rather than a solid response. A weight loaded hydraulic accumulator 74 is provided to provide hydraulic pressure in the system 43 in the event of failure of the pump 61.

For purposes of illustration and as shown in FIGURE 2, it is assumed that the elevator cars or skips 23 and 25 are designed to transfer material removed from the earth such as ore, coal, etc. from first, second and third loading levels or pockets in their respective shafts to dumping stations or storage bins 75 and 76 located at the tops of their shafts. Although only three levels are shown in this embodiment, it should be understood that a greater or lesser number of loading levels may be provided. It should also be understood that the automatic control of this invention may also be used with a mine hoist drum connected to a single car in a single shaft.

Two magnetic proximity switches are provided at each loading level in each shaft and are mounted with one of the proximity switches positioned to stop the skip at the proper loading position relative to the pocket and the other proximity switch mounted above the loading level at a point where a loaded skip will be clear of the loading pocket and free to be accelerated at full load, and an empty skip will be in position to be slowed to creep speed if it is to be stopped at the loading level. Six to eight feet spacing between these switches may be sufficient. As shown in FIGURE 2, proximity switches 77, 81 and 85 are provided respectively above the loading levels 1, 2 and 3 in shaft 27 and proximity switches 89, 93 and 97 are provided respectively above the loading levels 1, 2 and 3 in shaft 29. Proximity switches 79, 83 and 87 are provided respectively at loading levels 1, 2 and 3 in shaft 27 and proximity switches 91, 95 and 99 are provided respectively at loading levels 1, 2 and 3 in shaft 29. The proximity switches both at and above the loading levels are activated by magnets mounted on the hoist skips. The proximity switches located above the loading levels are direction sensitive, i.e. their contacts move in the direction of the skip travel.

Automatic control of the hoist operation is accomplished, as shown in FIGURE 1, through means of an electric hydraulic actuator 101, electrical circuits located in a control panel 102, a programmer panel 103, loading level panels 106, an actuator governor control 125, and a pair of skip position sensing mechanisms 104. The electric hydraulic actuator 101 controls the operation of the brake valve 63 and is connected to a brake valve operating rod 105 which connects to the manual brake control lever 69.

Figures 4, 5, 6, 6A:
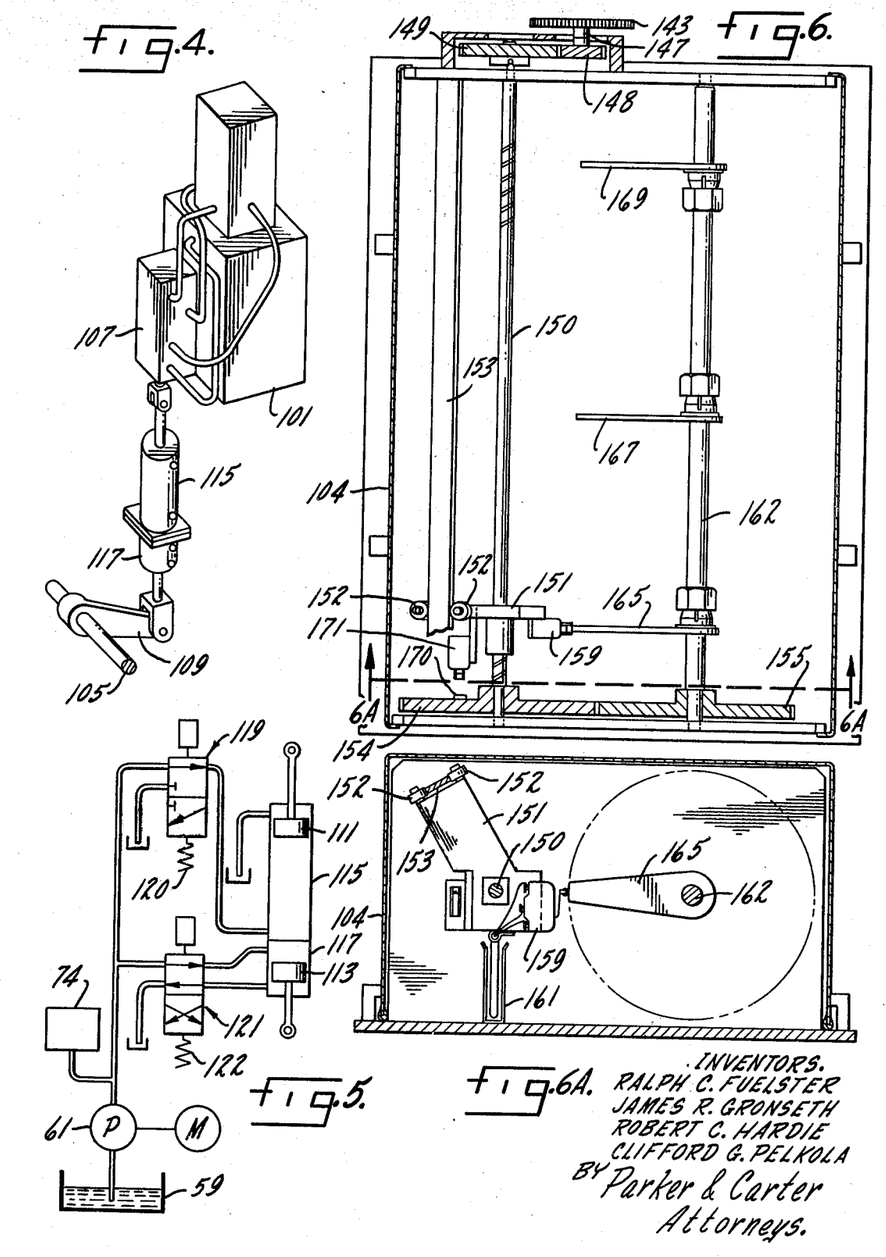
FIGURE 4 is a perspective view of the electric hydraulic actutor and its connection to the brake valve control rod.
FIGURE 5 is a schematic view of the hydraulic circuitry for operatively connecting and disconnecting the electric hydraulic actuator and the brake valve control rod.
FIGURE 6 is a plan view of one of the mine hoist skip position sensing indicators.
FIGURE 6A is a cross-sectional view taken along line 6A—6A of FIGURE 6.
Figure 8:
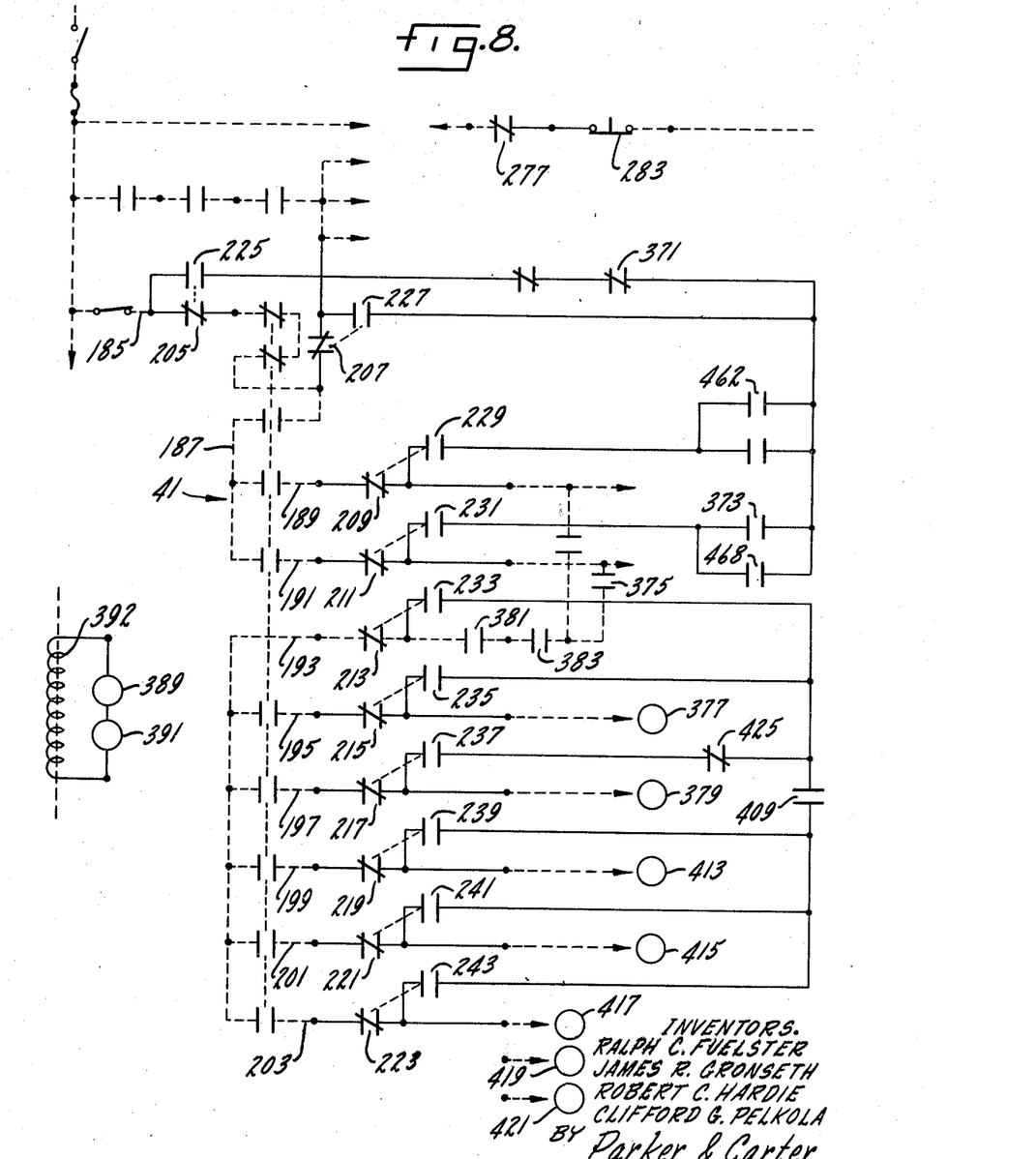
FIGURE 8 is a wiring diagram showing the hoist motor drum switch as modified for automatic operation.

A suitable electric hydraulic actuator and governor control are sold by The Woodward Governor Company of Rockford, Illinois. The actuator 101 is connected to the brake valve operating rod 105 as is shown in FIGURE 4 by means of a remote servo 107 and lever 109 which are connected, respectively, to pistons 111 and 113 (FIGURE 5) mounted in hydraulic cylinders 115 and 117. The hydraulic cylinders are aligned end to end with cylinder 115 acting as a telescoping link when unpressurized to permit manual operation of the brake lever 69 without back driving the electric hydraulic actuator. Hydraulic cylinder 117 acts as a lost motion takeup to prime the brake preceeding actual braking. Electric solenoid operated valves 119 and 121 regulate the flow of hydraulic fluid supplied by a pump 61 and accumulator 74 of the brake system 43 to, pressurize and actuate the cylinders. The solenoid operated valves 119 and 121 are equipped respectively with springs 120 and 122 designed to return the cylinders 115 and 117 to the condition which permits manual operation of the brake system. For example, the de-energization of solenoid 119 will move the valve to the opposite position from that shown in FIGURE 5 so as to stop the flow of fluid to and bleed the fluid from cylinder 115 to disengage the actuator 101. De-energization of solenoid 121 will move the valve to tthe position shown in FIGURE 5 to reverse the flow of fluid to cylinder 117 so as to move the piston 113 to take up the clearance between the brakes and the hoist drums.

The operation of the electric hydraulic actuator 101 is controlled by the governor control mechanism 125 (FIGURES 1 and 10) which compares the actual speed of the elevator skip as indicated by a direct current voltage, obtained from a magnetic pickup 173 monitoring a pulse gear 131 driven from the motor pinion shaft 133 (FIGURES 1 and 1A) through a gear train 135, with a voltage obtained from a voltage ramp and indicating a desired speed for a skip at a particular location in the shaft. The governor control transmits a resultant electrical signal to the actuator to operate it. Operation of the actuator controls the braking by moving the brake valve plunger 65 to control the flow of brake fluid to the brake cylinder 55.

The skip position sensing units 104, one of which is operatively connected to the hoist drum 31 and the other to the hoist drum 33 (FIGURE 1), function to control the locations in the shafts at which the hoist skips are decelerated. Each position sensing unit, as shown in FIGURES 6 and 6A, includes a gear 143 which is operatively connected to an existing gear 145 (FIGURE 1) of a "LILLY" stop mechanism 146. A 'LILLY" stop mechanism is operatively connected to each of the hoist drums. In each position sensing unit (FIGURE 6), the gear 143 is mounted on a shaft 147 with a smaller gear 148. Gear 148 meshes with a gear 149 which is mounted on and rigidly attached to one end of a ball screw rod 150 for rotation therewith. A carriage 151 is mounted on and driven by the ball screw rod. This carriage has guide wheels 152 which ride on a guide rail 153 which extends parallel to the ball screw rod. A gear 154 is attached to the opposite end of the ball screw rod. This gear meshes with a gear 155. A mechanically operated micro-switch 159 is mounted on the carriage of the unit associated with hoist drum 31 and another mechanical micro-switch 160 is mounted on the carriage of the unit associated with hoist drum 33. Wiring to the micro-switch is carried in a guide channel 161. A shaft 162 is positioned parallel to the ball screw rod 150 and three adjustable arms, 165, 167 and 169 of equal lengths are mounted on the shaft. Shaft 162 is rotated by gear 155 which is affixed to one end thereof. Each arm can be precisely positioned along the length of the shaft 162. When a rotating arm meets the micro-switch on the carriage, deceleration of the hoist is initiated. The arms should be positioned so that this will occur when a skip is approximately 200 feet above any one of the loading levels.

In this instance, as shown in FIGURES 7A and 7B, the arm 165 of each unit 104 indicates the first loading level, the arm 167 indicates the second loading level and the arm 169 indicates the third or lowest loading level. A projection 170 is formed on the side of the gear 154 in each unit 104 facing the carriage 151 and is adapted to be engaged by a second micro-switch carried by each carriage 151. This switch identifies the dumping station at the top of each shaft. Switch 171 is provided in the unit 104 associated with hoist drum 31 and switch 172 is provided in the unit 104 associated with hoist drum 33.

The gear train ratio between the hoist drum, "LILLY" stop mechanism and the components of the position sensing units such as the gears, the ball screw pitch, length of rotating arms and length of travel of the carriage 151 are designed so that a repeatability of less than one foot of conveyance position during descent is obtained. This results in an adequately sensitive, but not at all critical skip position sensing unit which is easily adjustable.

As previously mentioned, a magnetic pickup 173 monitors a pulse gear 131 which is driven from the motor pinion shaft 133 as shown in FIGURE 1A. This pickup provides a pulse signal to the governor control 125 whose frequency varies directly with the hoist drum speed. Another magnetic pickup 175 monitors this pulse gear and is connected to an overspeed relay to be described later.

Figure 12:
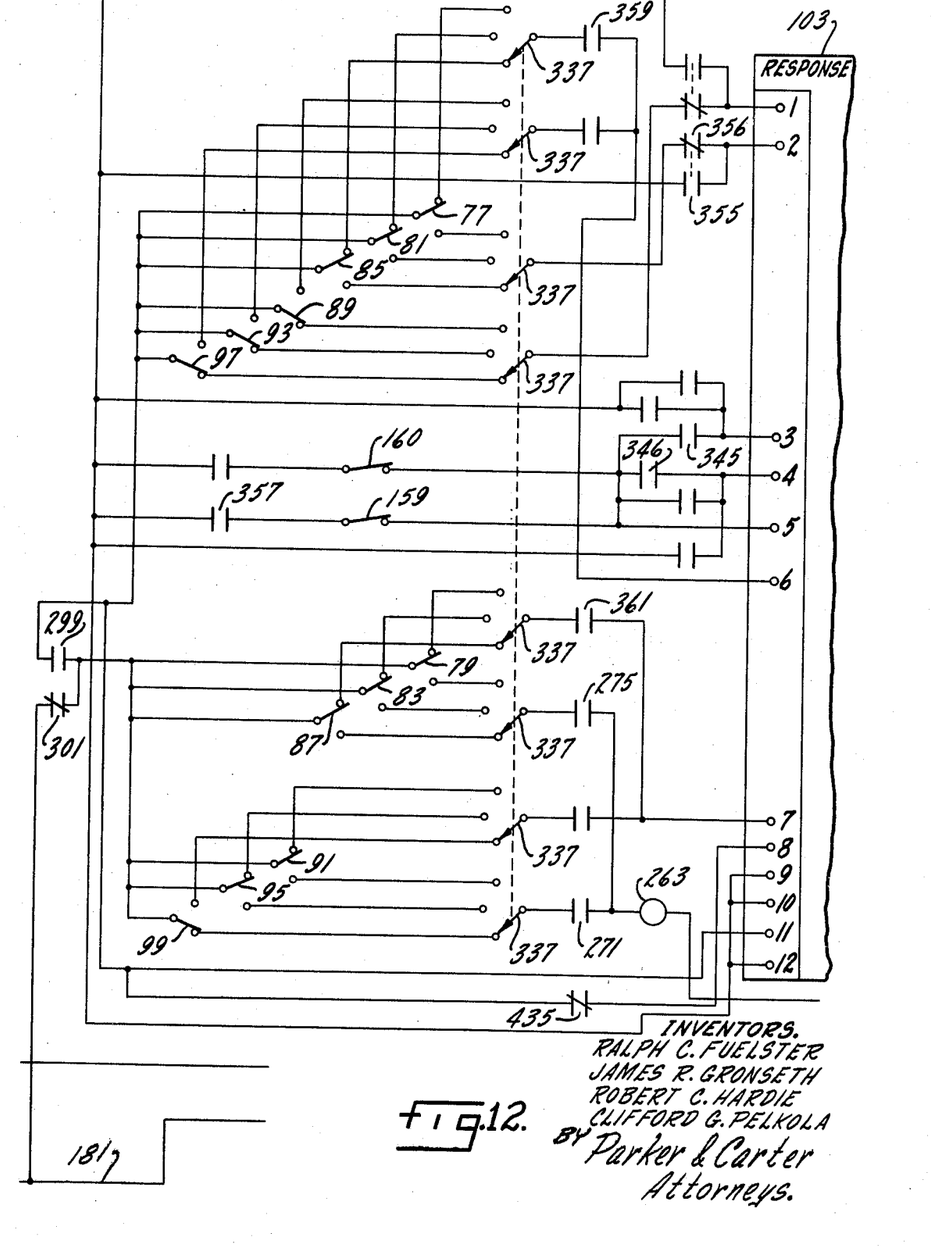
FIGURE 12 is a wiring diagram showing a portion of the circuits connected to the programmer panel.
Figure 13:
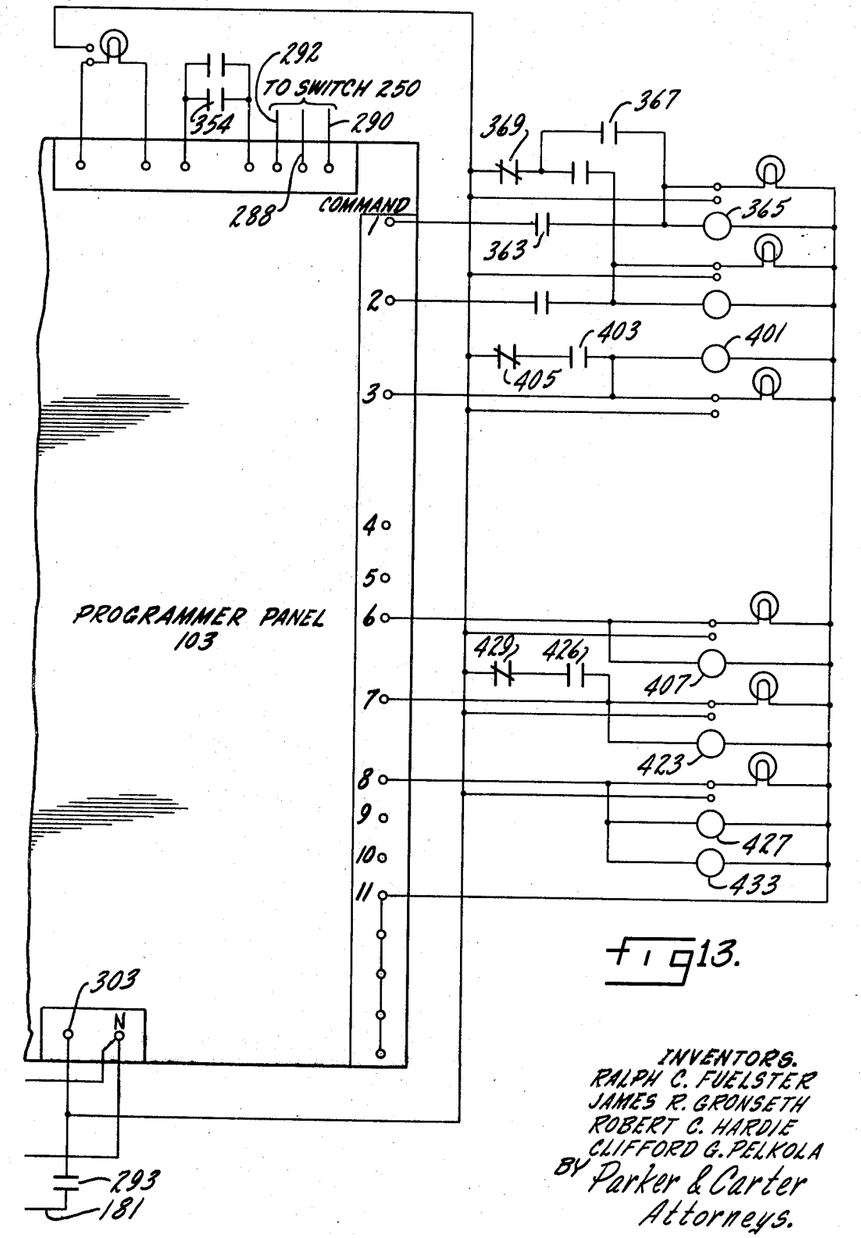
FIGURE 13 is a wiring diagram showing another portion of the circuits connected to the programmer panel.

The required sequential programming for the automatic mine hoist control system is provided by the programmer panel 103 shown in FIGURES 12 and 13. The basic function of the programmer panel is to sequentially connect a 120 volt alternating current electrical supply 181 to the terminal block points labeled command on the programmer panel 103 as shown in FIGURE 13. In the programmer panel illustrated in the drawings, the command terminal block (FIGURE 13) has ten numbered points (1 to 10) plus a common terminal point 11. The response terminal block (FIGURE 12) has ten points numbered one to ten, a common terminal point 11 and a skip terminal point 12. The sequential progression of the command voltage along the command terminal block points is controlled by normally closed contact devices connected between a response terminal block point and the response common terminal point. When the command voltage 181 is presented at a given command terminal block point, the corresponding numbered response terminal point is monitored such that when the normally closed contact device wired to that response terminal block point is broken, the command voltage 181 progresses to the next terminal block point. This programming sequence is accomplished by use of a rotary stepping switch with one bank used for the command voltage control and a second bank used for monitoring the response conditions required for program progression. A programmer suitable for this purpose is the "Flextrol C-R Programmer" sold by Programmed and Remote Systems Corporation, St. Paul, Minn.

The wiring circuits which interconnect the drum switch 41, the electric hydraulic actuator 101, the programmer panel 103, the position sensing mechanisms 104, the proximity switches, the loading level panels and the electric hydraulic actuator governor control 125 are shown in FIGURES 8 through 13. For automatic operation, the existing wiring (shown as dashed) of the drum switch 41 (FIGURE 8) is modified so that the drum switch leads 185, 187, 189, 191, 193, 195, 197, 199, 201 and 203 are carried through normally closed contacts 205, 207, 209, 211, 213, 215, 217, 219, 221 and 223 of automatic transfer contacts 225, 227, 229, 231, 233, 235, 237, 239, 241 and 243. The 120 volt alternating current supply 181 may be obtained from a transformer 245 (FIGURE 9) which connects to a 240 volt alternating current circuit 247 which is tapped from the hoist motor 37 power circuit.

The operation of the hoist may be placed under automatic control upon actuation of pushbutton 249 located in the control cabinet 102. The automatic control may be disengaged and the hoist returned to manual operation by actuation of another pushbutton 251. The actuation of pushbutton 249 energizes automatic transfer relay 253 and atomatic transfer slave relay 255. Actuation of the pushbutton 249 also energizes the programmer panel 103 through contact 250. Relay 255 will not operate unless test switch 257 is in its closed position. Additionally, before relays 253 and 255 will operate, level select check relay contacts 259 and 261 (FIGURE 11) must be closed. These contacts are operated by level selector check relay 263 (FIGURE 12). This relay is energized provided either of the skip position sensing units 104 shows that skip 23 or 25 is at its dump station position in shaft 27 or 29 and the other skip is at the selected level loading position in the opposite shaft.

Figure 9:
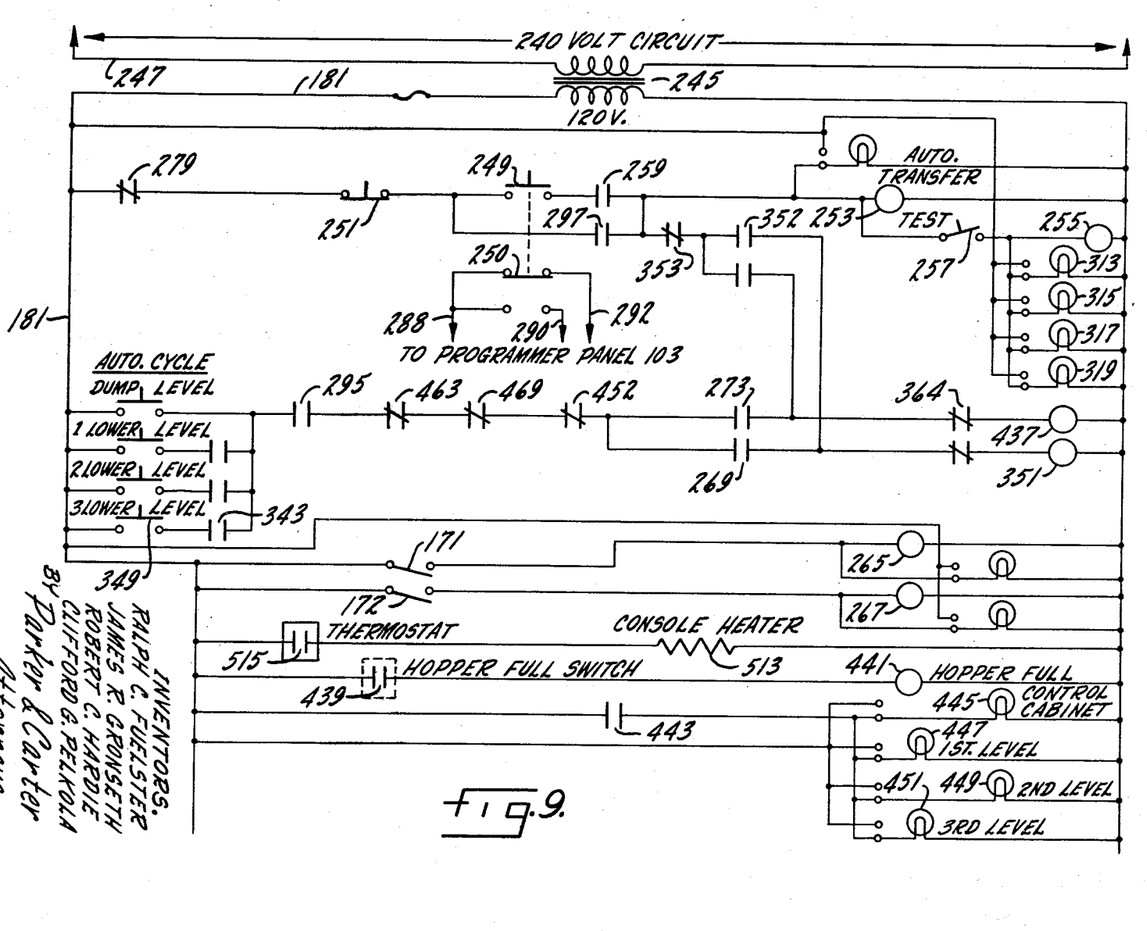
FIGURE 9 is a wiring diagram showing a portion of the automatic control circuitry.

For example, if skip 23 is at the dumping station at the top of shaft 27 as shown in FIGURE 2, "conveyance up" switch 171 (FIGURES 7A and 9) will be actuated to close relay 265 (FIGURE 9). If skip 25 were at the dumping position at the top of shaft 29, "conveyance up" switch 172 (FIGURES 7B and 9) would be operated to actuate the relay 267 (FIGURE 9). Energization of relay 265 will close its contacts 269 in the automatic cycle turn off circuit (FIGURE 9) and contacts 271 (FIGURE 12) leading to the programmer panel 103. Energization of relay 267 will close contacts 273 in the automatic cycle turn on circuit (FIGURE 9) and contacts 275 leading to the programmer panel 103 (FIGURE 12).

Figure 11:
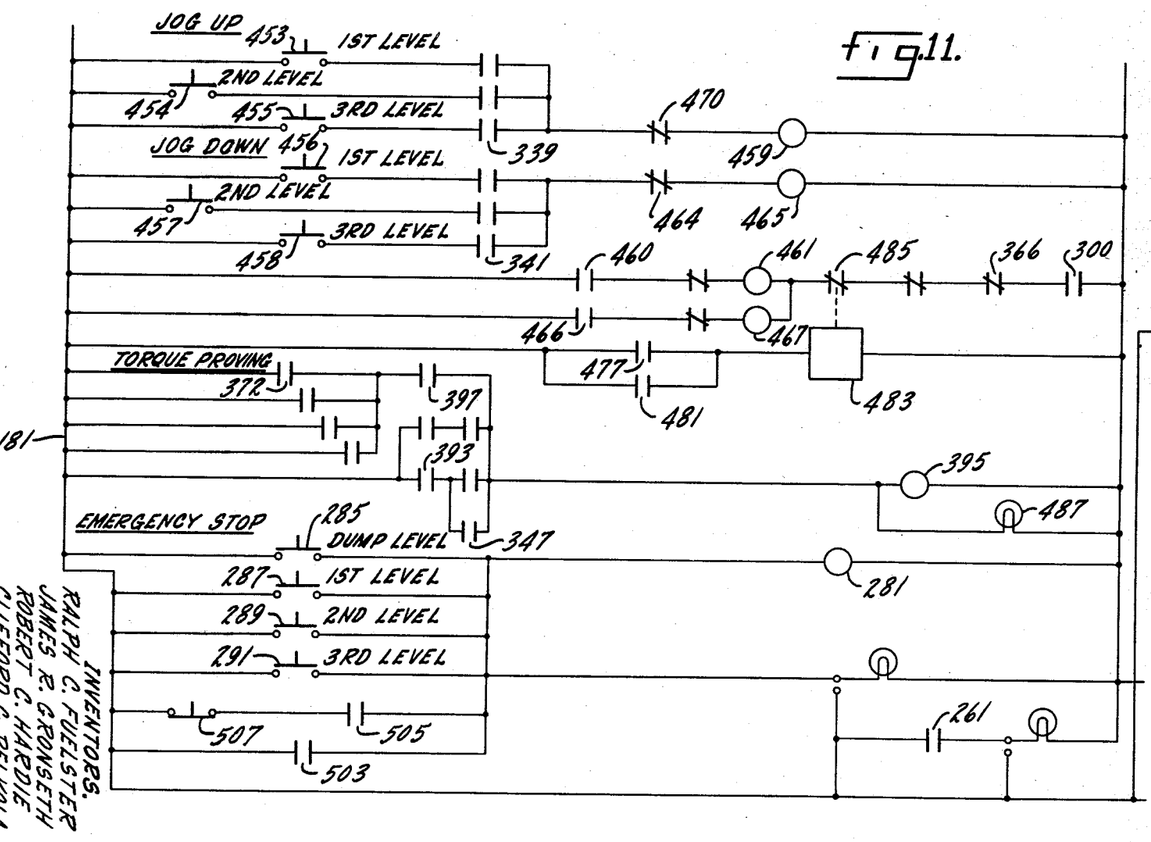
FIGURE 11 is a wiring diagram showing the jog up, jog down, torque proving and emergency stop circuits.

Also, before the automatic cycle can be initiated, the emergency stop contacts 277 (FIGURE 8) and 279 (FIGURE 9) must be in their normally closed positions. These contacts may be opened by energization of emergency stop relay 281 (FIGURE 11). This relay may be energized by emergency stop operating button 283 (FIGURE 8) which is located at the mine hoist control cabinet 102 at the top of the shafts and by buttons 285, 287, 289 and 291, (FIGURE 11) which are, respectively, located at the dump level, first, second and third loading levels of the shafts.

The actuation of the pushbutton 249, which places the mine hoist under automatic control, disconnects leads 288 and 292 and connects leads 288 and 290 causing the panel 103 to reset to its home position and to become prepared for automatic cycling. Operation of this button also energizes relay 253, closing its contacts 293 (FIGURE 13), 295 and 297 (FIGURE 9), 299 (FIGURE 12) and 300 (FIGURE 11) and opening its normally closed contacts 301 (FIGURE 12). The closing of contacts 293 supplies 120 volt alternating current from line 181 to terminal 303 of the programmer panel 103 (FIGURE 13). The closing of contacts 295 closes the automatic cycle start pushbutton circuits to allow automatic sequence starts of the hoist. The closing of contacts 297 locks the automatic transfer circuit in the automatic position through emergency stop normally closed contacts 279 and normally closed shutoff pushbutton contacts 251. Closing of contacts 299 and opening of normall closed contacts 301 (FIGURE 12) transfer the 120 volt line 181 from the proximity switches 79, 83, 87, 91, 95 and 99 (FIGURE 12) to the programmer 103 response common lead 11. Contacts 300 are located in the jogging circuit to be described later.

Operation of automatic transfer slave relay 255 which is energized by the actuation of pushbutton 249 closes contacts 225, 227, 229 231, 233, 239, 241 and 243 (FIGURE 8) to transfer the control leads to the motor control sequence relays from the drum switch to the automatic sequence relays. The energization of relay 255 also opens normally closed contacts 307 (FIGURE 10) of the governor control 125 which controls the input to the electric hydraulic actuator 101 and closes the normally open contacts 309 which control the output from this governor. Additionally, contacts 311 are closed to operate the electric solenoid controlling valve 119 (FIGURE 10) to admit fluid to hydraulic cylinder 115 so as to engage the actuator 101 to the brake shaft 105. Indicating lights 313, 315, 317 and 319 (FIGURE 9) are respectively located at the control cabinet 102 and the first, second and third loading levels to show that the system is on automatic operation.

Figure 10:
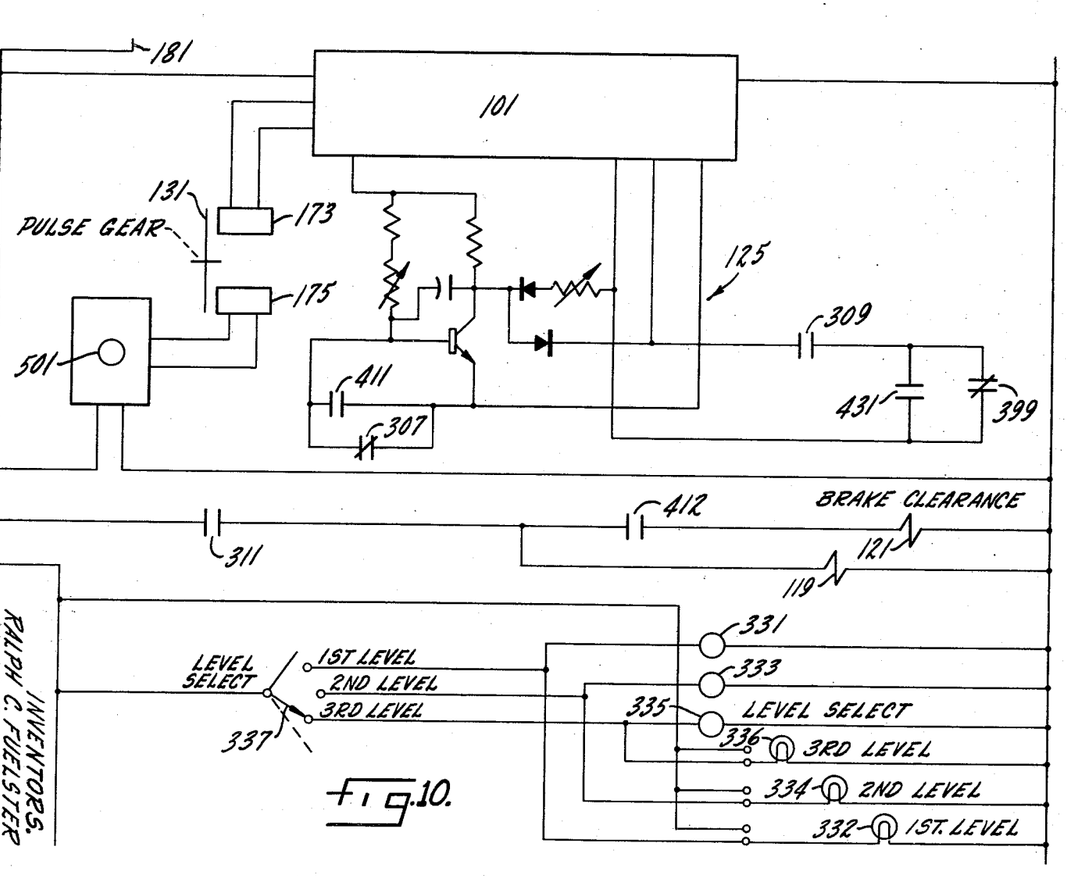
FIGURE 10 is a wiring diagram showing the electric hydraulic actuator, its governor control and the level select circuits.

For purposes of description, it will be assumed that the skip 23 in shaft 27 is at dump station or storage bin 75 at the top of the shaft and skip 25 is at the third or lowest level in shaft 29, as shown in FIGURE 2. An automatic sequence cycle relay is provided for each loading level with relay 331 for the first level, relay 333 for the second level and relay 335 for the third level (FIGURE 10). A level select switch 337 is provided in the control cabinet 102 and for purposes of description will be considered as switched to the contact for the third level so as to energize relay 335. Energization of relay 335 will close contacts 339 in the third level jog up circuit (FIGURE 11), contacts 341 in the third level jog down circuit, contacts 343 in the third level auto cycle circuit (FIGURE 9), contacts 345 leading to the programmer panel response terminal point 3 (FIGURE 12), contacts 346 leading to the programmer response terminal point 4 (FIGURE 12), and contacts 347 in the torque proving circuit (FIGURE 11). Similar contacts are provided in parallel with the aforementioned contacts in each of these circuits for the relays 331 and 333. The selection of the first or second level would actuate either relay 331 or 333 and close the contacts associated with it. Indicator lights 332, 334 and 336 are provided to show selection of the first, second or third levels.

After the level select switch 337 is turned to the third level contact, the automatic cycle pushbutton 349 on the third level (FIGUE 9) may be actuated to energize relay 351 since the contacts 269 of relay 265 are closed. Relay 351 will lock operated through its contacts 352 and normally closed contacts 353 of the stop relay to be described later. Energization of relay 351 also closes its contacts 354 (FIGURE 13) to place the 120 volt alternating current signal of line 181 on command terminal point 1 of the programmer panel 103; closes relay contacts 355 (FIGURE 12) connecting response terminal point 2 of the programmer panel to the response skip terminal 12 of the programmer panel; opens normally closed contact 356 leading to the proximity switch 85; closes contacts 357, 359, and 361 to response terminal points 5, 6 and 7; and closes contacts 363 (FIGURE 13) to complete the operating circuit from command terminal point 1 to relay 365 for lowering skip 23. Relay 351 also opens normally closed contacts 364 to the hoist relay 437 (FIGURE 9) and normally closed contacts 366 in the jog circuit (FIGURE 11).

The 120 volt alternating current on command terminal point 1 of panel 103 energizes relay 365 (FIGURE 13) which locks operated through its contacts 367 and normally closed contacts 369 of the stop relay 427. Also, energization of relay 365 opens normally closed contacts 371 (FIGURE 8) which removes the short circuit from the output leads of actuator governor control 125, closes contacts 372 (FIGURE 11) in the torque proving circuit, and also closes the contacts 373 to supply voltage to the lowering contactor 375. Operation of lowering contactor 375 in turn immediately energizes the accelerating relays 377 and 379 through the contacts 381 and 383 of relays of the existing motor control circuit which are not shown. As the motor contactors close, current is drawn by the motor 37. When this current is of sufficient value, current relays 389 and 391 (FIGURE 8) operate. Relays 389 and 391 are connected to the step-down side of a current transformer 392 take-off on the power supply to the motor 37. Contacts 393 (FIGURE 11) of relay 391 operate torque proving relay 395 which locks operated through its own contacts 397 and contacts 372 of relay 365.

Energization of relay 395 also opens normally closed contact 399 (FIGURE 10) to remove the final short on the output of the actuator governor control 125, thus operating the hydraulic actuator 101 the amount necessary to release the mine hoist brake system 43 sufficiently to allow the skips to move at creep speed of approximately 120 feet per minute. As the hoist drum and cable begin lifting skip 25 at this creep speed, the two position sensing units 104 rotate in such a manner as to move their respective switches 159 and 160 in the proper direction. The creep speed of the skip 25 continues until proximity switch 97 above the third loading level is actuated by the passage of the skip (FIGURE 2).

Actuation of proximity switch 97 in shaft 29 by skip 25 interrupts the continuity between response terminal point 1 and the response common terminal point 11 (FIGURE 12). Interruption of the continuity between these terminal points has the effect of causing the programmer panel 103 to step the 120 volt command voltage from the command 1 terminal point to the command 2 terminal point (FIGURE 13). However, since the response 2 terminal point (FIGURE 12) is connected at this time to the response skip terminal point 12, the command voltage is immediately stepped to the command 3 terminal point.

Voltage on command 3 terminal point (FIGURE 13) operates the full speed relay 401 which locks operated through its own contacts 403 and normally closed contacts 405 of the slow down relay 407. Additionally, the energization of relay 401 closes contacts 409 (FIGURE 8), which close accelerating relay coil lead 199, 201 and 203 to operate accelerating relays 413, 415, 417, 419 and 421; and closes contacts 411 (FIGURE 10), which close the input terminals to actuator governor control 125 to operate actuator 101 to completely release brake system 43. The energization of relay 401 also closes contacts 412 which operate solenoid 121 to provide brake clearance by allowing the piston 113 (FIGURES 4 and 5) to telescope in the cylinder 117 connected between the remote servo and the brake valve operating rod 105. The hoist motor 37 now lifts skip 25 at full speed.

It should be noted that the proximity switches 77, 81, 85, 89, 93 and 97 (FIGURE 2) used to mark the clearing of the skips from the loading pockets at the first, second and third loading levels are of the type that move their contacts in the direction of the skip travel as it moves past and the contacts remain in this direction until tripped by the return of the skip. As skip 25 moves up the shaft 29 and skip 23 moves down the shaft 27, tripping of the proximity switches at levels 1 and 2 will have no effect as they are switched out of the circuit. As skip 25 is raised and skip 23 is lowered, the position sensing switch 159 of the position sensing unit 104 of hoist drum 31 will be actuated by the cam arm 165 (FIGURE 7A) marking the first loading level of shaft 27. Opening of switch 159 will open the connection between response terminal point 3 and the response common terminal point 11 on the programmer panel 103 (FIGURE 12), thus causing the command voltage to step to command terminal point 4 (FIGURE 13). The application of the command voltage to command terminal point 4 has no effect on the system as no connection exists on this command terminal point.

Likewise, the movement of switch 159 past the cam arm 167 (FIGURE 7A) marking the second loading level in shaft 27 breaks the circuit via switch 159 to the response terminal point 4 (FIGURE 12) causing the command voltage and response to step to terminal points 5. Again no connection exists to command terminal point 5 (FIGURE 13). When switch 159 is again operated by passing cam arm 169 marking the third loading level of the shaft, the command voltage steps to command terminal point 6 to energize relay 407 (FIGURE 13).

Energization of relay 407 opens its normally closed contacts 405 to break the circuit to full speed relay 401. De-energization of relay 401 opens its own contacts 403 to unlock itself; opens its contacts 409 (FIGURE 8) which drop out the motor accelerating relays 413, 415, 417, 419 and 421; and opens contacts 411 (FIGURE 10) which open the input to the actuator governor control 125. Additionally, contacts 412 are open to de-energize solenoid 121 which removes the brake clearance by supplying hydraulic fluid to cylinder 117 to force piston 113 to its extended position to give the actuator 101 immediate braking control. Opening of the actuator governor control input circuit causes the actuator 101 to bring about a slowing of the skips 23 and 25 at a linear rate to a creep speed of approximately ten percent of full speed.

When the skip 23 operates proximity switch 85 located above the third loading level in shaft 27 (FIGURE 2), the response terminal point 6 circuit (FIGURE 12) to the response common terminal point 11 is broken causing the command voltage to step to command terminal point 7 of the programmer panel 103. Upon stepping of the command voltage to terminal point 7, relay 407 is de-energized and relay 423 is energized opening its normally closed contacts 425 (FIGURE 8) dropping the motor control to its second speed step. Relay 423 locks operated through its contacts 426 (FIGURE 13) and normally closed contacts 429. At this time, skips 23 and 25 should be moving at their preset creep speed as controlled by the actuator governor control 125.

When skip 23 actuates proximity switch 87 at loading level three in shaft 27 (FIGURE 2), the circuit between response terminal point 7 and response common point 11 (FIGURE 12) is broken causing the command voltage to move to command terminal point 8 (FIGURE 13). This energizes relay 427, which opens its normally closed contacts 369 to de-energize relay 365; opens its normally closed contacts 429 to de-energize relay 423; and closes its normally open contacts 431 (FIGURE 10) in the actuator governor control 125.

The de-energization of relay 365 (FIGURE 13) opens its relay contacts 373 (FIGURE 8) interrupting the motor control circuit 191 and closes contacts 371 to shut off the output of the actuator governor control 125, thus bringing about full braking by the actuator 101. The hoist is thus brought to a stop with skip 23 at the third level loading pocket and skip 25 at the dumping hopper 76 (FIGURE 2. The de-energization of relay 365 also opens contacts 372 (FIGURE 11) to de-energize torque proving relay 395 to prepare for torque proving at the next start up.

Also energized when the command voltage is applied to command terminal point 8 is time delay relay 433 (FIGURE 13). After this relay operates to open its normally closed contacts 435 (FIGURE 12), the circuit between response terminal point 8 and response terminal common point 11 is broken and the programmer panel 103 steps the command voltage to command terminal point 9 (FIGURE 13) where it is skipped past terminal points 9 and 10 back to its home position. The system is now ready for its next cycle in which the skip 23 is moved upwardly and the skip 25 is moved downwardly.

The sequence of operation when the automatic cycle pushbutton 349 is operated with skip 23 at the third loading level in shaft 27 (FIGURE 2) is similar to that described above except that hoisting relay 437 (FIGURE 9) is energized instead of lowering relay 351 and the position sensing switch 160 (FIGURE 12) is monitored instead of switch 159. Likewise, as skip 25 approaches the third loading level of shaft 29, the proximity switches 97 and 99 are monitored. Otherwise the operation will be the same as previously described.

Where the first loading level in a shaft is selected rather than the third level as described previously, the programmer panel 103 skips from response terminal point 3 (FIGURE 12) to response terminal point 5. Thus, when the slow down switch 159 or 160 is first actuated, the slow down sequence will be initiated. Likewise, when the second loading level is selected, only terminal point 3 will be skipped, thus requiring the switch 159 or 160 to be actuated twice for slow down initiation. The level select relays 331, 333 and 335 (FIGURE 10) also choose the torque providing relay 389 (FIGURE 8) for the loading level and 391 for the second and third loading levels.

Should either of the dumping hoppers 75 or 76 become full, the hopper full switch 439 (FIGURE 9) will operate to energize hopper full relay 441 to close the hopper full contacts 443 and indicate this condition by lighting lights 445, 447, 449 and 451 located respectively at the control cabinet 102, first, second and third levels and will break the automatic cycle circuit by opening normally closed contacts 452 (FIGURE 9). With contacts 452 open, the cycle in process may be completed but a subsequent cycle cannot be initiated.

Hoist jogging, that is limited movement of a skip up or down to bring it to the proper loading level, may be accomplished when the system is in the automatic condition, provided the system is not in an automatic cycle. Jog up buttons 453, 454 and 455 (FIGURE 11) are provided, respectively, for the first, second and third loading levels in each shaft and jog down buttons 456, 457 and 458 are also provided, respectively, for the first, second and third loading levels in each shaft. If either jog button 453, 454 or 455 is operated, jog up relay 459 will be energized and will close contacts 460 to energize relay 461 and thereby close its contacts 462 (FIGURE 8) in the third speed step circuit 189 of the motor accelerating contactors. Normally closed contacts 463 (FIGURE 9) in the automatic cycle circuit and 464 (FIGURE 11) in the jog down circuit will also be opened upon energization of relay 459.

Likewise, if one of the jog down buttons 456, 457 or 458 (FIGURE 11) is operated, relay 465 will be energized and will close its contacts 466 to energize relay 467 in turn closing its contacts 468 (FIGURE 8) which energizes the third speed step circuit 191 of the motor accelerating contactors. Normally closed contacts 469 (FIGURE 9) in the automatic cycle circuit and 470 (FIGURE 11) in the jog up circuit will also be opened upon energization of relay 469. Operation of contacts 462 or 468 (FIGURE 8) will supply current to the contacts 381 and 383 to operate the relays 389 and 391 closing the circuit to the torque proving relay 395 (FIGURE 11). The actuator governor control 125 output leads are open by the opening of normally closed contacts 399 (FIGURE 10) upon energization of relay 395 allowing the brake 43 to release sufficiently for creep speed of the skip.

Energization of relay 459 (FIGURE 11) also closes its contacts 477 in a jog timer circuit. Likewise, energization of relay 465 of the jog down circuit closes its contacts 481 in the jog timer circuit. The jog circuit is controlled by a timer 483 having normally closed contacts 485. The timer may be adjusted to open contacts 485 and break the job circuit after a preset delay. Breaking of the circuit serves to protect the hoist motor from overheating from continuous running at creep speed.

A torque proving light 478 (FIGURE 11) is provided to give a positive indication that the torque proving relays are functioning.

Over speed detector 175 (FIGURE 10) connects to over speed relay 501. Energization of relay 501 closes contacts 503 (FIGURE 11) to close the circuit to the emergency stop relay 281. Over speed relay 501 operates only when the hoist speed exceeds its normal maximum. This would occur if a loaded skip were lowered and an empty skip raised.

Emergency stop buttons 285, 287, 289 and 291 (FIGURE 11) are respectively provided at the dump, first, second and third levels. Operation of any one of these buttons energizes emergency stop relay 281 which locks operated through its own relay contacts 505 and emergency stop reset button 507. Energization of relay 281 also opens normally closed contact 279 (FIGURE 9) in the automatic cycle circuit placing the hoist control on manual and at the same time opens normally closed contacts 277 (FIGURE 8) in the drum switch to bring the existing manual hoist control into automatic stop operation.

In order to test the system without closing the actual operating circuits to the hoist, the test switch 257 (FIGURE 9) may be placed in the test position and the automatic cycle may be initiated and the hoist run manually. The automatic sequence will be followed with the indicator lights providing a display as to the functioning of the automatic sequence. Thus a varification of proper automatic operation may be had prior to placing the system on automatic.

A heater 513 (FIGURE 9) controlled by a thermostat 515 may be installed in the control cabinet 102. The heater will prevent moisture accumulation in the control cabinet.

If desired, a circuit to prove that the electric hydraulic actuator 101 is functioning properly may be installed. Such an indication is desirable before the controls are changed from manual to automatic operation.

We claim:

1. An automatic control system for a mine hoist having at least one car adapted to move between an upper position and at least one lower position, an electric motor operatively connected to a hoist drum, a cable connecting said car and said hoist drum, brakes biased into engagement with said hoist drum to retard and stop rotation thereof, a hydraulic piston adapted upon energization to overcome the bias acting against the brakes and to release said brakes, a source of hydraulic fluid operatively connected to said brake hydraulic piston, a valve controlling the flow of said hydraulic fluid to said piston, and a valve control lever controlling the opening of said valve, said automatic control system including:

an electric hydraulic actuator operatively connected to said brake valve control lever to move said lever to vary the amount of opening of said valve, means to determine the position of the car in the shaft, means to determine the speed of said hoist drum, a programming device to sequentially start, accelerate, decelerate and stop the rotation of the hoist drum and the movement of the car in the shaft in accordance with the position of the car relative to a selected position in the shaft with the deceleration of said hoist drum being controlled by selectively operating said electric hydraulic actuator to reduce the speed of rotation of the hoist drum, the actuator being operated by a difference between the actual speed of rotation of the hoist drum as indicated by said speed determining means and a desired speed for the car for a selective rate of deceleration, and means connecting said electric hydraulic actuator and said brake valve control lever which permits selective operative engagement and disengagement of said actuator and said lever upon signal from said programming device, said means including a cylinder having a piston and a piston rod mounted for movement therein, said cylinder and piston rod connecting said actuator and said lever, a source of hydraulic fluid to move said piston and piston rod between telescoped and extended positions relative to the cylinder, and means controlled by said signal from said programming device to direct hydraulic fluid into and out of said cylinder.

2. An automatic control system for a mine hoist having at least one car adapted to move between an upper position and at least one lower position, an electric motor operatively connected to a hoist drum, a cable connecting said car and said hoist drum, brakes biased into engagement with said hoist drum to retard and stop rotation thereof, a hydraulic piston adapted upon energization to overcome the bias acting against the brakes and to release said brakes, a source of hydraulic fluid operatively connected to said hydraulic piston, a valve controlling the flow of said hydraulic fluid to said piston, and a valve control lever controlling the opening of said valve, said automatic control system including:

an electric hydraulic actuator operatively connected to said brake valve control lever to move said lever to vary the amount of opening of said valve, means to determine the position of the car in the shaft, means to determine the speed of said hoist drum, a programming device to sequentially start, accelerate, decelerate and stop the rotation of the hoist drum and the movement of the car in the shaft in accordance with the position of the car relative to a selected position in the shaft with the deceleration of said hoist drum being controlled by selectively operating said electric hydraulic actuator to reduce the speed of rotation of the hoist drum, the actuator being operated by a difference between the actual speed of rotation of the hoist drum as indicated by said speed determining means and a desired speed for the car for a selective rate of deceleration, and means operatively connecting said electric hydraulic actuator and said brake control lever to allow limited movement of said brake control lever to provide and remove clearance of the brakes, said means including a cylinder having a piston and piston rod mounted for movement therein for a limited distance, a source of hydraulic fluid to move said piston and piston rod between telescoped and extended positions relative to the cylinder, and means to direct hydraulic fluid into said cylinder to move said piston and piston rod between said positions upon signals from said programming device.

3. An automatic control system for a mine hoist having at least one car adapted to move between an upper position and at least one lower position, an electric motor operatively connected to a hoist drum, a cable connecting said car and said hoist drum, brakes biased into engagement with said hoist drum to retard and stop rotation thereof, a hydraulic piston adapted upon energization to overcome the bias acting against the brakes and to release said brakes, a source of hydraulic fluid operatively connected to said brake hydraulic piston, a valve controlling the flow of said hydraulic fluid to said piston, and a valve control lever controlling the opening of said valve, said automatic control system including:

an electric hydraulic actuator operatively connected to said brake valve control lever to move said lever to vary the amount of opening of said valve, means to determine the position of the car in the shaft, means to determine the speed of said hoist drum, a programming device to sequentially start, accelerate, decelerate and stop the rotation of the hoist drum and the movement of the car in the shaft in accordance with the position of the car relative to a selected position in the shaft with the deceleration of said hoist drum being controlled by selectively operating said electric hydraulic actuator to reduce the speed of rotation of the hoist drum, the actuator being operated by a difference between the actual speed of rotation of the hoist drum as indicated by said speed determining means and a desired speed for the car for a selective rate of deceleration, and a voltage ramp for providing said desired speed for said car during deceleration, a governor for comparing the desired speed with the actual speed obtained from said speed determining means with the governor providing a resultant signal to operate said electric hydraulic actuator to move the brake valve control lever.

4. An automatic control system for a mine hoist having at least one car adapted to move between an upper position and at least one lower position, an electric motor operatively connected to a hoist drum, a cable connecting said car and said hoist drum, brakes biased into engagement with said hoist drum to retard and stop rotation thereof, a hydraulic piston adapted upon energization to overcome the bias acting against the brakes and to release said brakes, a source of hydraulic fluid operatively connected to said brake hydraulic piston, a valve controlling the flow of said hydraulic fluid to said piston, and a valve control lever controlling the opening of said valve, said automatic control system including.

an electric hydraulic actuator operatively connected to said brake valve control lever to move said lever to vary the amount of opening of said valve, means to determine the position of the car in the shaft, means to determine the speed of said hoist drum, a programming device to sequentially start, accelerate, decelerate and stop the rotation of the hoist drum and the movement of the car in the shaft in accordance with the position of the car relative to a selected position in the shaft with the deceleration of said hoist drum being controlled by selectively operating said electric hydraulic actuator to reduce the speed of rotation of the hoist drum, the actuator being operated by a difference between the actual speed of rotation of the hoist drum as indicated by said speed determining means and a desired speed for the car for a selective rate of deceleration, and a pair of cylinders joined end-to-end operatively connecting said actuator and said lever, a piston and a piston rod in each cylinder, one of said piston rods connected to said actuator and the other connected to said lever, a source of hydraulic fluid to individually move each piston and piston rod between telescoped and extended positions relative to its cylinder, and means to selectively direct said hydraulic fluid to and from said cylinders to move said piston and piston rod between said positions upon signal from said programming device.

(References on following page)

References Cited

UNITED STATES PATENTS

| | | | |
|---|---|---|---|
| 2,278,120 | 3/1942 | Schwartz | 318—369 |
| 2,382,263 | 8/1945 | Schnell | 318—372 |
| 2,804,586 | 8/1957 | Spiess | 318—269 |
| 2,669,324 | 2/1954 | Lund | 187—29 |
| 2,746,567 | 5/1956 | Guttinger et al. | 187—29 |
| 2,792,080 | 5/1957 | Dunlop | 187—29 |
| 2,828,832 | 4/1958 | Spiess et al. | 187—29 |

FOREIGN PATENTS

Combined Rock and Service Mine Hoist ASEA Journal 31 (1958), No. 1–2, pages 9 and 10.

ORIS L. RADER, Primary Examiner

K. L. CROSSON, Assistant Examiner

U.S. Cl. X.R.

187—29.12; 318—272, 369